(12) United States Patent
Nelson et al.

(10) Patent No.: US 8,059,415 B2
(45) Date of Patent: Nov. 15, 2011

(54) MOLDED COMMUNICATIONS MODULE HAVING INTEGRATED PLASTIC CIRCUIT STRUCTURES

(75) Inventors: Stephen T. Nelson, Santa Clara, CA (US); Donald A. Ice, Milpitas, CA (US); Darin James Douma, Monrovia, CA (US)

(73) Assignee: Finisar Corporation, Sunnyvale, CA (US)

( * ) Notice: Subject to any disclaimer, the term of this patent is extended or adjusted under 35 U.S.C. 154(b) by 960 days.

(21) Appl. No.: 11/958,085

(22) Filed: Dec. 17, 2007

(65) Prior Publication Data

US 2008/0212972 A1   Sep. 4, 2008

Related U.S. Application Data

(60) Provisional application No. 60/870,331, filed on Dec. 15, 2006, provisional application No. 60/870,334, filed on Dec. 15, 2006, provisional application No. 60/870,338, filed on Dec. 15, 2006.

(51) Int. Cl.
*H05K 5/00* (2006.01)
(52) U.S. Cl. .................... 361/752; 361/730; 361/737
(58) Field of Classification Search ................ 361/752, 361/730, 737, 715, 748, 720, 759–760; 174/50; 439/65, 76.1, 620.22; 385/14, 88, 92, 94
See application file for complete search history.

(56) References Cited

U.S. PATENT DOCUMENTS

| 5,513,073 | A | * | 4/1996 | Block et al. | 361/719 |
| 5,535,034 | A | * | 7/1996 | Taniguchi | 398/139 |
| 5,875,047 | A | * | 2/1999 | Abe et al. | 398/135 |
| 7,276,267 | B2 | * | 10/2007 | Schauz | 427/554 |
| 7,314,318 | B2 | * | 1/2008 | Anderl et al. | 385/92 |
| 2009/0163045 | A1 | * | 6/2009 | Peloza et al. | 439/55 |
| 2010/0243844 | A1 | * | 9/2010 | Peloza et al. | 248/310 |

* cited by examiner

*Primary Examiner* — Hung S Bui
(74) *Attorney, Agent, or Firm* — Maschoff Gilmore & Israelsen

(57) ABSTRACT

An embodiment disclosed herein relates to a communications module. The communications module includes a body composed of a plastic resin and a plurality of conductive traces and contact pads defined on a portion of a surface of the body. The module also includes at least one substantially vertical ridge defined on the body surface, and at least one pocket defined on the body suitable for receiving an electronic component. The communications module may also include a body composed of a plastic resin and conductive features defined on a surface of the body configured to render the communications module operable without implementing a printed circuit board as part of the body. Additional embodiments relate to systems and methods for attaching one or more optical transmit assemblies to the communications module and for electrically connecting conductive traces in a temporary fashion on the surface of the body of the communications module.

15 Claims, 17 Drawing Sheets

MOLDED COMMUNICATIONS MODULE HAVING INTEGRATED PLASTIC CIRCUIT STRUCTURES

CROSS-REFERENCE TO RELATED APPLICATIONS

This application claims the benefit of U.S. Provisional Application No. 60/870,331, filed Dec. 15, 2006, U.S. Provisional Application No. 60/870,334, filed Dec. 15, 2006, and U.S. Provisional Application No. 60/870,338, filed Dec. 15, 2006, all of which are incorporated herein by reference in their entirety.

BACKGROUND

1. The Field of the Invention

The present invention generally relates to communications modules. In particular, the present invention relates to a communications module, such as an optical transceiver module, that is integrally fabricated so as to reduce part count and simplify construction and design.

2. The Relevant Technology

Traditionally designed optical transceiver modules typically include several components, including one or more optical subassemblies, a printed circuit board with associated electronic circuitry, and a shell supporting the printed circuit board. Though proven, this design nevertheless compels various compromises to be tolerated, due to limitations inherent in the above-mentioned components and their respective interconnections. In light of this, a need exists in the art for a communications module, such as an optical transceiver module, that includes improvements that provide simplification of design and part count reduction while improving device reliability.

BRIEF SUMMARY

An embodiment disclosed herein relates to a communications module. The communications module includes a body composed of a plastic resin and a plurality of conductive traces and contact pads defined on a portion of a surface of the body. The module also includes at least one substantially vertical ridge defined on the body surface, and at least one pocket defined on the body suitable for receiving an electronic component.

An additional embodiment disclosed herein relates to a communications module. The communications module includes a body composed of a plastic resin and one or more conductive features defined on a surface of the body. The one or more conductive features are configured to render the communications module operable without implementing a printed circuit board as part of the body.

A further embodiment disclosed herein relates to a system for electrically connecting at least one optical subassembly to an optical transceiver module. The optical transceiver module has a molded body and conductive features defined on portions of the molded body. The system comprises an interconnect portion integrally formed with the molded body including: a plurality of holes defined on a front wall of the molded body, the holes being configured to each receive a corresponding one of a plurality of leads extending from an optical subassembly, and a plurality of lead seats each in communication with a corresponding one of the plurality of holes, each lead seat configured such that the lead received by the corresponding hole is in electrical communication with the lead seat. The system also includes a plurality of traces defined on the molded body that each electrically connect with a corresponding one of the lead seats.

Another embodiment disclosed herein relates to a method for electrically connecting conductive traces in a temporary fashion. The traces are included on a surface of a molded body of an optical transceiver module. The method includes defining a plurality of trace interconnection features as extended portions on a surface of the molded body such that the trace interconnection features are interposed between the traces. The method also includes applying a conductive material to each of the trace interconnection features such that the trace interconnection features electrically interconnect the traces to one another. The method further includes, when electrical interconnection of the traces is no longer needed, altering a structure of each of the trace interconnection features such that the traces are no longer electrically interconnected by the trace interconnection features.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale. It is also understood that reference to a "first", or a "second" etc. element (such as a first and second interconnect portions) in this description and in the claims is meant to distinguish one element from another and is not meant to imply sequential ordering unless explicitly stated.

FIGS. 1A-12C depict various features of embodiments of the present invention, which are generally directed to a communications module for use in transmitting and receiving data signals in a communications network. In particular, a communications module implemented as an optical transceiver module is disclosed. The optical transceiver module includes a molded integral body and electronic component surface designed to substantially simplify transceiver design and reduce part count. Because of its simplified design, the molded transceiver is highly stable and efficiently produced, thereby increasing part yield during manufacture.

1. Example Molded Communications Module

Figure 1A:
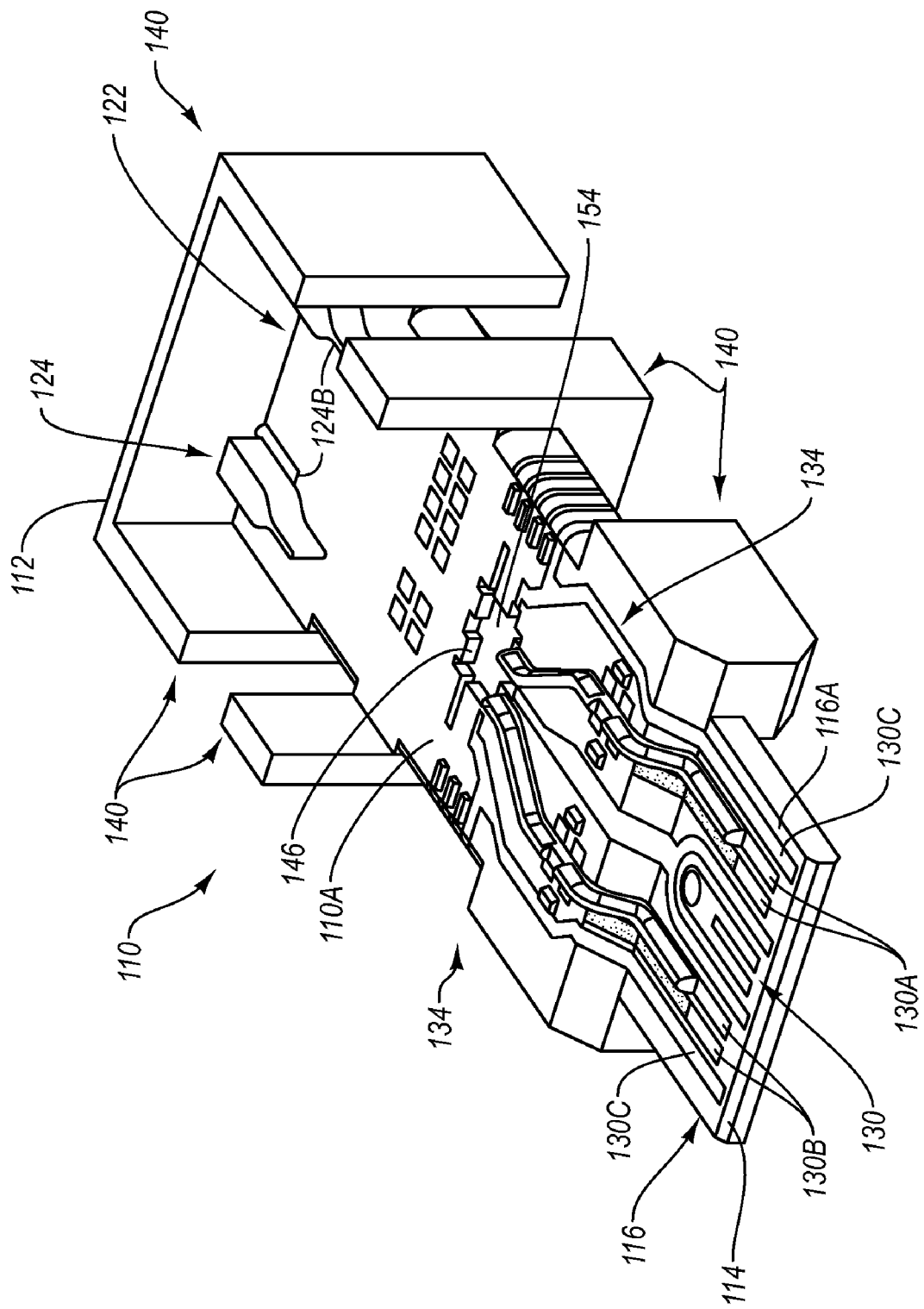
FIG. 1A is a perspective top view of portions a molded communications module, according to one embodiment of the present invention.
Figure 1B:
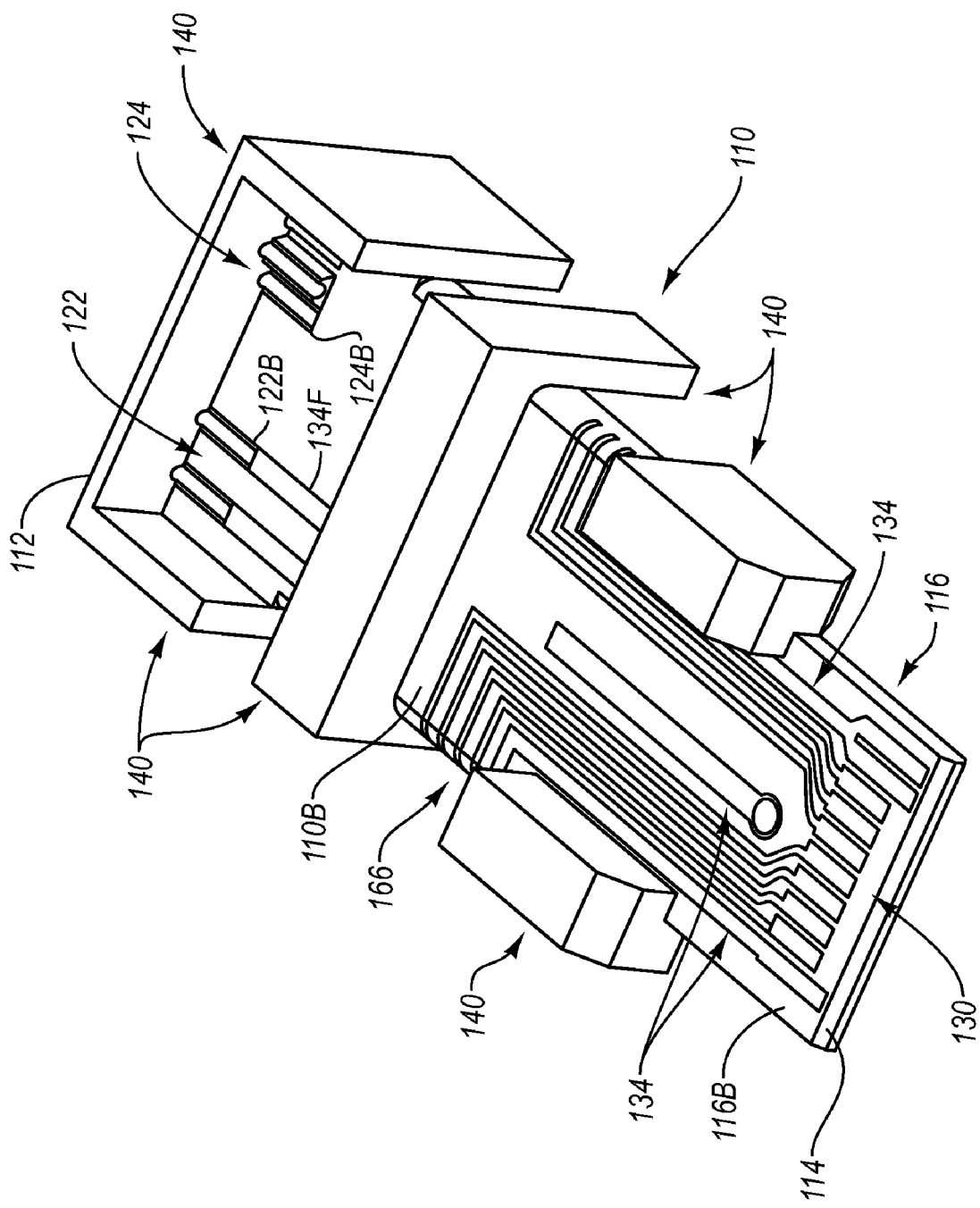
FIG. 1B is a perspective bottom view of the molded communications module of FIG. 1A.
Figure 2:
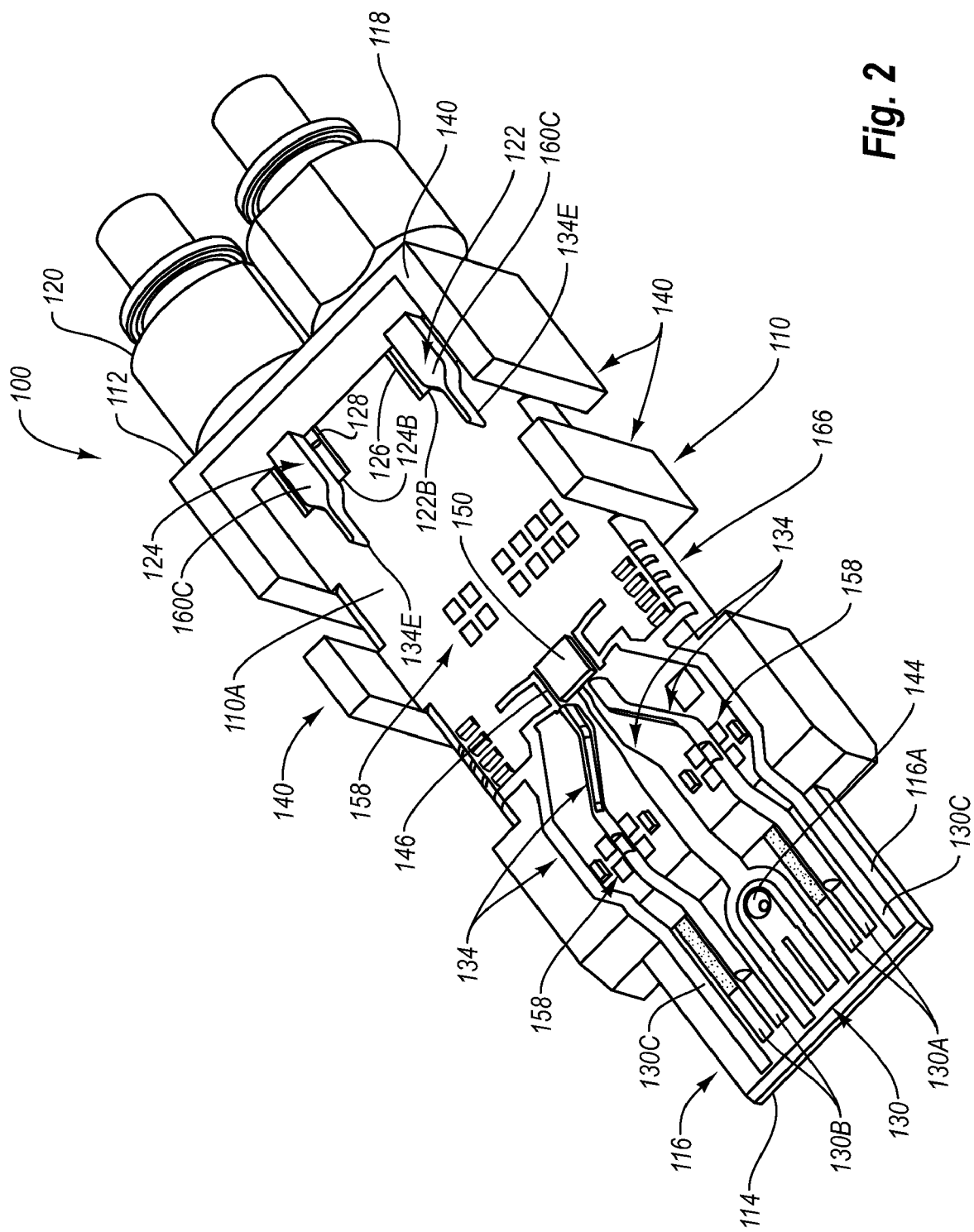
FIG. 2 is a perspective top view of the molded communications module of FIG. 1A, having a pair of optical subassemblies operably attached thereto.

Reference is first made to FIGS. 1A, 1B, and 2, which depict various details regarding features of the present invention, according to one embodiment. These figures show one type of communications module that can benefit from the teachings of the present invention. In particular, an optical transceiver module ("transceiver"), generally designated at 100, is shown as an exemplary communications module including aspects of one embodiment of the present invention.

As shown, the transceiver 100 is implemented as having a form factor and configuration conforming to a Small Form Factor Pluggable ("SFP") standard, as defined by applicable Multi-Source Agreements ("MSAs") standard in the industry. However, it should be noted that transceivers and other communications modules that differ in form factor, operational configuration, or other aspects can also benefit from the principles discussed herein. Indeed, modules such as 10 Gigabit Small Form Factor Pluggable ("XFP") transceivers having varying form factors and data rates can also employ features of the embodiments to be described herein. The following discussion is therefore not meant to limit the scope of the present invention in any way.

As shown, the transceiver 100 includes a body 110 that is formed by standard injection molding or other suitable molding process. As such, the transceiver body is also referred to herein as a "molded module." As will be described, the body 110 serves multiple purposes within the transceiver 100 that were formerly performed by multiple components, and as such simplifies transceiver design by serving as an integrated component.

The transceiver body 110 is composed of a suitable material to enable the formation of conductive features on the body in the manner described below. In one embodiment, the body 110 is composed of a plastic resin, such as a liquid crystal polymer, having a catalyst intermixed therewith. In one embodiment, the catalyst is composed substantially of palladium, but other suitable materials offering the same functionality could alternatively be used. As mentioned, this material composition for the transceiver body enables conductive features to be defined on the body, as will be described further below.

The transceiver body 110 further includes a top body surface 110A and bottom body surface 110B, and defines a front end 112 and back end 114. The back portion of the body 110 proximate the back end 114 defines an edge connector 116 that enables the transceiver 100 to operably connect with a host device (not shown). The edge connector 116 itself defines a top surface 116A and bottom surface 116B. Note that the edge connector 116 has a height that is relatively less than that of other portions of the body 110, in conformance with industry-defined standards for such an interface.

As seen in FIG. 2, the transceiver 100 includes a pair of optical subassemblies that each operably connect with connectorized optical fibers. In detail, a transmitter optical subassembly ("TOSA") 118 and receiver optical subassembly ("ROSA") 120 are included in the transceiver 100 and are shown in operable communication with the transceiver body 110 in FIG. 2. The TOSA 118 operably connects with the transceiver body 110 via a TOSA interconnect portion 122 that extends beyond and between both the body top and bottom surfaces 110A and 110B, while the ROSA 120 operably connects with the transceiver body via a ROSA interconnect portion 124, which extends beyond and between the body top and bottom surfaces. Further details regarding the particular modes of connection between the TOSA, ROSA, and the transceiver body are described in more detail to follow.

Inspection of FIGS. 1A-2 reveals that the present transceiver design differs from previously known designs in that a printed circuit board, traditionally included within a transceiver shell, is not present. Instead, the molded transceiver body integrally serves the functionality previously performed by the printed circuit board and shell. In particular, the conductive contact pads, traces, and electronic components traditionally found on a transceiver printed circuit board are now included on the top and bottom surfaces 110A and 110B of the transceiver body 110. Further, the structure of the transceiver body 110 is configured such that it also performs the functionality traditionally performed by a discrete shell in housing the printed circuit board and other transceiver components. Thus, significant consolidation and integration of formerly discrete transceiver components is realized via the present transceiver configuration. Further, use of the present transceiver body enables the inclusion of various surface features and three-dimensional structures to be included thereon, as will be described.

Figure 3:
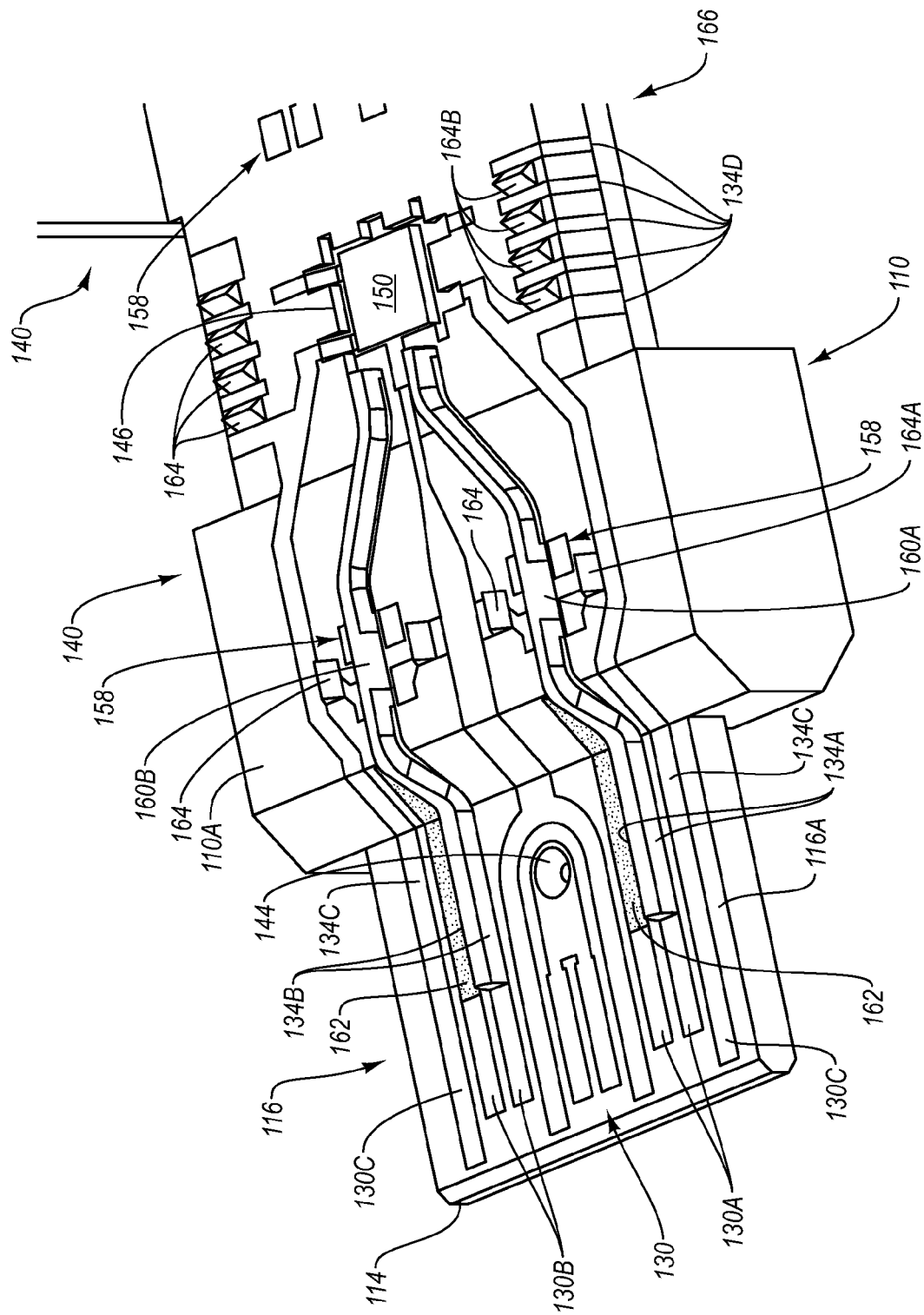
FIG. 3 is a close-up perspective top view of the molded communications module of FIG. 1A, including an integrated circuit chip included thereon.

Together with FIGS. 1A-2, reference is now made to FIG. 3, showing various further details of the transceiver 100. A plurality of contact pads 130 are included on both the top and bottom surfaces 116A and B of the edge connector 116 for interfacing with corresponding pads or conductive features of the host device (not shown). Among these pads are disposed a first data signal pad pair 130A and a second data signal pad pair 130B that each facilitate the transfer of high speed data signals between the host device and the transceiver 100. Additionally, a plurality of conductive traces 134 are also included on the transceiver body 110 and operably connect with corresponding contact pads 130 on both the top and bottom surfaces 116A and B of the edge connector 116 to enable the transfer of various signals in the transceiver 100. Among these traces are disposed a first data signal trace pair 134A and a second data signal trace pair 134B that each operably connect with the corresponding first or second data signal pad pairs 130A or 130B of the edge connector 116. Also included are ground traces 134C that operably connect with corresponding ground contact pads 130C on the edge connector 116.

The conductive contact pads 130 and traces 134 are defined on the surface of the transceiver body 110 by a process known as laser direct structuring, wherein a guided laser is employed during transceiver body manufacture in etching the surfaces of the body 110 where conductive features such as the contact pads and traces are to be located. Laser etching in this manner removes several microns of the plastic resin body material at the surface thereof, which exposes and activates the palladium catalyst imbedded in the plastic resin. So prepared, placement of the body 110 in an electroless plating bath causes copper or other suitable component of the bath to adhere to the laser etched portions of the body, thereby forming the contact pads 130, traces 134 and other conductive features described below on the body.

Formation of conductive features on a catalyst-containing plastic resin using the laser direct structuring process as described above yields a product also known as and referred to herein as a "plastic circuit." This process and technology is owned and licensed by LPKF Laser and Electronics AG, Germany, http://www.lpkf.com/. Products formed by this process are generally known as molded interconnect devices ("MID"s).

Should the particular path, shape, or other configuration of the contact pads 130, traces 134, or other conductive features need to be altered for a transceiver body yet to be manufactured, the laser need simply be reprogrammed to etch the body surface in accordance with the desired change. In this way, reconfiguration of the conductive features of the transceiver body is readily achieved without significant expense or time.

In accordance with embodiments of the present invention, the transceiver body 110 can be configured to include various surface features serving various purposes for the transceiver 100. These surface features give the transceiver body 110 a three dimensional ("3-D") aspect that is not possible with known transceivers and other communication modules employing standard printed circuit boards ("PCBs"). The transceiver body configured to include the 3-D features to be described below is also referred to herein as a "3-D MID."

A first 3-D feature is shown on the transceiver body 110 as a plurality of various body extensions 140 that are formed as a result of the injection molded design of the body. The body extensions 140 serve various purposes in connection with the structure and functionality of the transceiver 100, such as providing structural bracing or spacing, and surfaces for engagement with a cover to provide a housing (not shown) for the transceiver, for instance. In one embodiment, the body extension 140 (seen in FIG. 2) proximate the TOSA 118 and ROSA 120 can be plated with conductive material via the laser direct structuring or other suitable process in order to reduce or prevent the emission of EMI from the transceiver 100. In other embodiments, other surfaces of the transceiver 100 can also be conductively plated to reduce EMI emission.

Another 3-D feature of the transceiver body 110 is shown at 144, wherein a hole, or via, is defined through the body so as to extend from the top body surface 110A to the bottom surface 110B. The via 144 enables signals transmitted on selected traces 134 to be transferred from one body surface to another, as best shown in FIGS. 1A and 1B. Note that the interior surface of the via 144 is slanted with respect to the top and bottom body surfaces 110A, B. This is to enable sufficient laser etching to be performed on the via 144 so that a conductive material may be applied thereto. Generally, the slant of such surfaces should be no greater than about 75 degrees from a plane define by the top or bottom body surface 110A or 110B. More generally, the slant is determined by the requirements of the particular laser etching equipment used. Note that many such vias can be defined in the transceiver body 110.

A component pocket 146 is defined on the top body surface 110A, as best shown in FIG. 1A, as yet another possible 3-D feature made possible by the transceiver body 110 configured in accordance with one embodiment. The component pocket 146 is sized and configured to receive therein an integrated circuit chip or other electronic or optoelectronic component. In the illustrated embodiment, an integrated laser driver/post amplifier/controller ("LDPA controller") 150 is shown in FIGS. 2 and 3 as residing within the component pocket 146.

The floor of the component pocket 146 includes a conductive pad 154 (FIG. 1) that is configured to electrically connect with the LDPA controller 150, either through wirebonds (not shown), an electrically conductive pad on the underside of the LDPA controller 150, or other electrical connective scheme when it is disposed in the component pocket 146. The conductive pad 154 in turn is electrically connected to one or more of the traces 134 that extend to the component pocket 146, such as the ground traces 134C in the present embodiment. The LDPA controller 150 is secured within the component pocket 146 with a conductive adhesive in one embodiment, or by solder paste or other suitable securing substance.

Note that, because the component pocket 146 is sunken with respect to the top body surface 110A, a top surface of the LDPA controller 150 when placed in the pocket is positioned substantially level with the top body surface 110A. This enables electrical connections of minimum length to be established between selected traces 134 that terminate at the component pocket 146 and conductive pads positioned on the LDPA controller 150. These electrical connections in the present embodiment are achieved by the use of wire bonds (not shown). As improved signal transmission is achieved with wire bonds when the wire bond length is minimized, the minimization of length between the terminations of the traces 134 proximate the component pocket 146 and the pads of the LDPA controller 150 advantageously operates to improve signal transmission—especially high frequency signals—between the two structures. Once placement, securing, and wire bonding of the LDPA controller 150 within the component cavity 146 is complete, the controller can be covered with epoxy to prevent damage to the controller or wire bonds.

Note that one or more component pockets 146 having varying sizes, depths, and particular configurations can be disposed at various locations on the top and bottom body surfaces 110A/B to receive multiple components as may be needed for a particular application. Also, though shown here with an LDPA controller, any one of various different components may be placed in this or other component pockets defined on the molded transceiver body. Further, more than one component may be received in each component pocket.

As best seen in FIG. 2, the molded transceiver body 110 includes a plurality of additional component pads 158 that, like the component pad 154 of the component pocket 146, enable the electrical connection of various electronic components to the body. Such electronic components can include capacitors, resistors, etc.

As yet another example of 3-D featuring of the molded transceiver body 110, a plurality of vertical ridges 160 are defined on the body so as to enable conductive traces to be defined thereon. In particular, a first ridge 160A having the data signal trace pair 134A disposed thereon, and a second ridge 160B having the data signal trace pair 134B disposed thereon are shown. The traces of each pair 134A and 134B are disposed on opposing sides of the respective ridges 160A and 160B. This configuration enables the traces of each pair to effectively couple with one another, thereby controlling their respective impedance, i.e., creating a differential impedance known as "broadside coupling," and preserving the quality of the data signals transmitted therethrough. Such a configuration compensates for the fact that no ground exists in the transceiver body 110 as would typically exist for coupling purposes in a standard printed circuit board.

Two troughs 162 as additional 3-D features are included on the transceiver body, defined on the top surface 116A of the edge connector 116 such that a back portion of each ridge 160A and 160B is positioned in the respective trough. So configured, the troughs 162 enable the ridges 160A and 160B to extend into the edge connector 116 in such a way as to not exceed the industry-defined 1 mm height restriction for this style of edge connector. Note that the rear termination of the troughs 162 corresponds with the point at which the data signal traces pairs 134A and 134B electrically connect with the corresponding data signal pads 130A and 130B, respectively.

Yet another 3-D feature of the molded transceiver body 110 is a plurality of trace interconnection features 164 located at various points on the transceiver body. These trace interconnection features 164 are employed to temporarily interconnect the various traces 134 one with another during the transceiver manufacturing process. Once interconnection between the traces 134 is no longer needed, the trace interconnection features 164 can be modified such that trace interconnection is terminated. Further details regarding the trace interconnection features 164, their structure and operation is described in more detail to follow.

Further note that the traces 134 disposed on the transceiver body 110 can pass between the bottom and top body surfaces 110A and 110B around the edges of the transceiver body, such as at locations 166. This is another feature not possible with standard printed circuit board technology.

Note that the transceiver body 110 is not limited to a single thickness, as is common with known printed circuit boards, but rather can be configured to have various 3-D surface features and thicknesses as may be needed or desired for a particular application. Thus, instead of a 1 mm thick printed circuit board in accordance with the thickness required for the edge connector, the transceiver body can have a plurality of thicknesses and configurations along its length on either the top, bottom, or other surface thereof.

A transceiver made in accordance with the principles presented herein includes relatively fewer parts than similar known transceiver designs, which yields a simpler, more stable and lower cost system. This in turn increases the potential for high volume production of such a transceiver. Further, the present transceiver does not suffer from the limitations described herein that are typically associated with known printed circuit boards. Transceiver design freedom is also greatly enhanced as a result of practice of the above embodiments.

2. Structural and Operational Aspects of Optical Subassembly Attachment with a Molded Communications Module With continuing reference to FIG. 2, reference is now made to FIGS. 4 and 5 in describing various features regarding embodiments of the present invention.

As briefly described above, suitable electrical connections between optical subassemblies and other portions of the transceiver, such as a printed circuit board, are often difficult to achieve without the use of an intermediary interface, i.e., a flexible circuit or lead frame connector. However, these components add to the complexity of the device and often introduce difficulties in matching impedance along the signal transmission path through the transceiver.

In accordance with embodiments of the present invention, operable connection of the TOSA 118 and ROSA 120 is achieved in a simple manner without the use of interposed structures, such as flexible circuits, lead frame connectors, and the like. In particular, and as has been mentioned, the TOSA interconnect portion ("TIP") 122 and ROSA interconnect portion ("RIP") 124 of the transceiver 100 are configured as part of a system to enable operable interconnection between the transceiver body 110 and the TOSA 118 and ROSA 120, respectively. As mentioned, the system described herein is configured for use with a four Gigabit SFP optical transceiver module; however, transceivers and other molded communications modules made in accordance with the principles taught herein can also benefit from the present disclosure.

Figure 5:
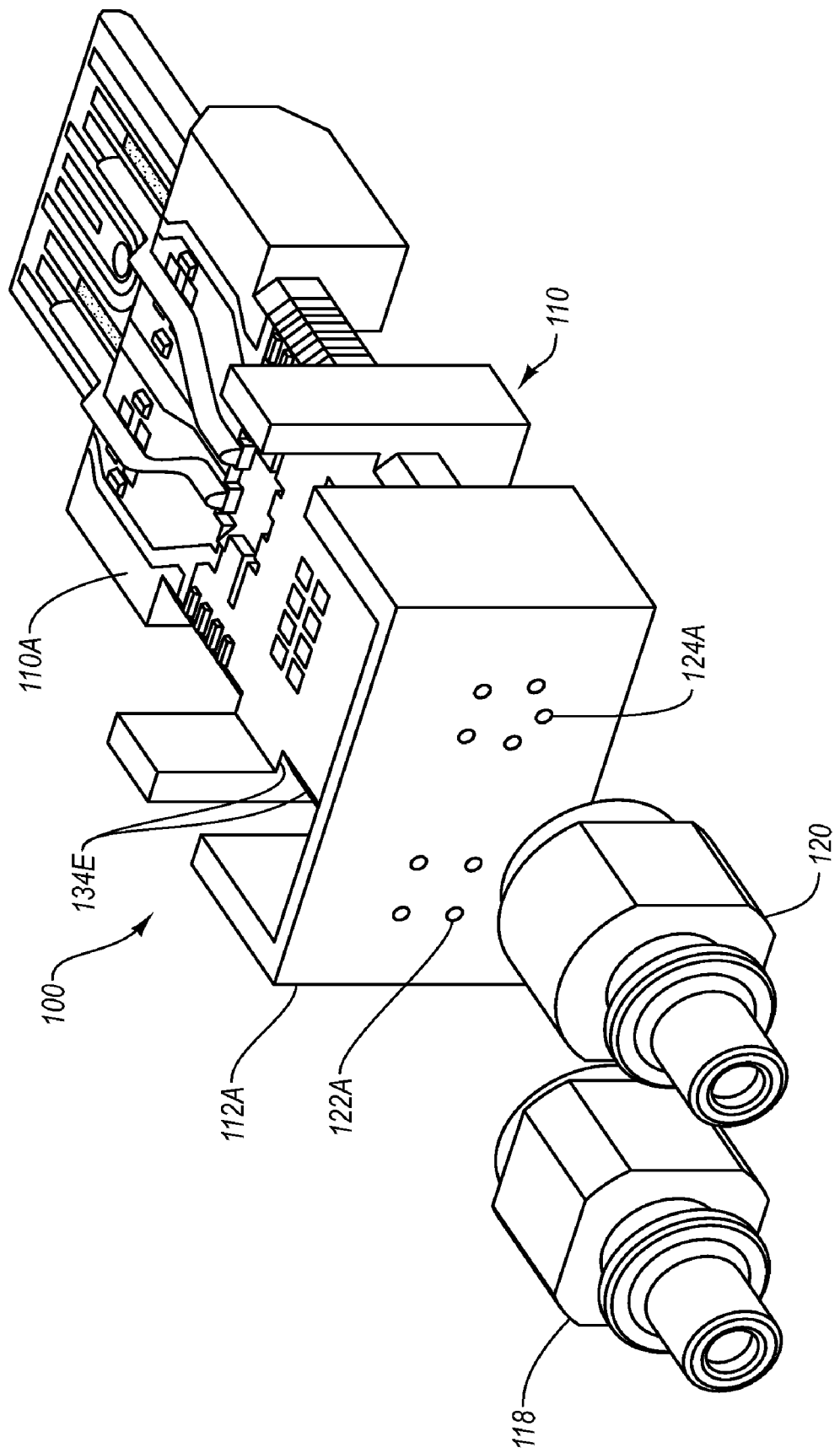
FIG. 5 is another exploded, perspective top view of the molded communications module shown in FIG. 4.

In greater detail, TIP 122 and RIP 124 each include a plurality of wall holes 122A and 124A, respectively, which are defined through a front end wall 112A, best seen in FIG. 5. The inner cylindrical surfaces of the wall holes 122A and 124A are conductively plated and are in physical and electrical communication with corresponding lead seats 112B and 124B, respectively, defined on the top body surface 110A adjacent an interior portion of the front end wall 112A, best seen in FIGS. 1A and 1B. Note that the wall holes 122A and 124A of the TIP 122 and RIP 124 are arranged such that some of the lead seats 122B and 124B are disposed on the top body surface 110A and some on the bottom body surface 110B, as best seen in FIG. 1A and 1B.

Each of the lead seats 122B, 124B is electrically connected with a corresponding one of front end top traces 134E or front end bottom traces 134F. The traces 134E, 134F are produced as a result of the laser direct structuring process described above, and are configured to electrically connect with other components or features of the transceiver 100, host device, or other structure. Note that in the present embodiment, pairs of the front end top traces 134E are positioned on opposite vertical sides of third and fourth ridges 160C or 160D, which in turn are defined on the top transceiver body surface 110A. The structure and operation, including broadside coupling, of the ridges 160C/160D and traces 134E are similar to that described in connection with the first and second ridges 160A/160B and the data signal trace pairs 134A/134B.

Figure 6:
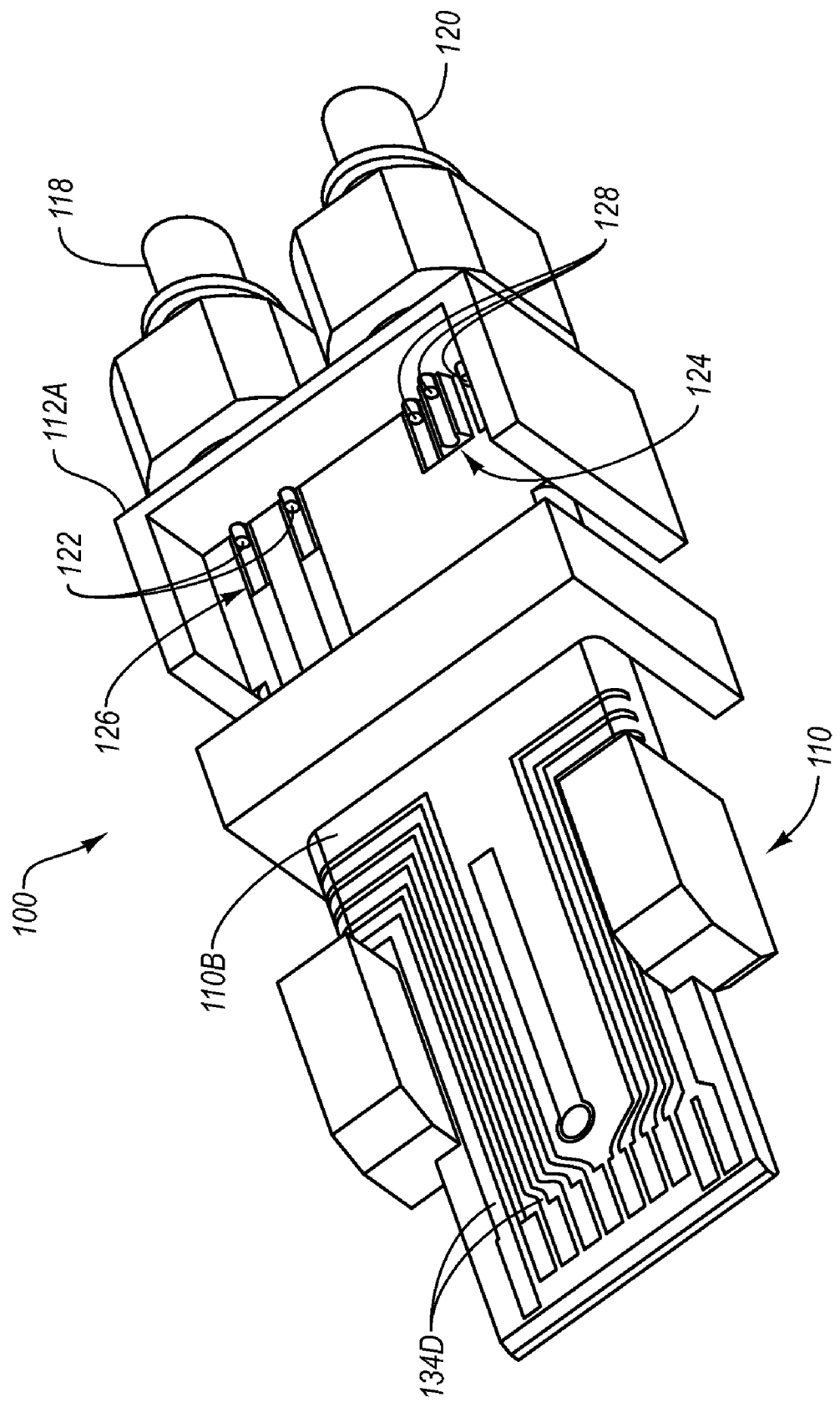
FIG. 6 is a perspective bottom view of the molded communications module of FIG. 4 in an assembled state, according to one embodiment of the present invention.

In addition, the lead seats 122B, 124B are configured to receive a corresponding one of the leads 126, 128 of the TOSA 118 or ROSA 120, respectively, so as to establish electrical communication between traces and components of the transceiver body 110 and the TOSA/ROSA. In particular, and as best seen in FIGS. 1A and 1B, each lead seat 122B/ 124B defines a half cylindrical concavity extending parallel to the horizontal surfaces of the transceiver body 110. Also, the lead seats 122B/124B are positioned with respect to one another so as to enable each seat to receive a corresponding one of the four leads 126 (TOSA) or five leads 128 (ROSA). This is achieved by configuring the thickness of transceiver body 110 to allow the wall holes 122A/124A and lead seats 122B/124B to be positioned proximate the top and bottom transceiver body surfaces 110A/110B. FIG. 6 shows that the middle lead 128 of the ROSA 120 is raised further above the other two leads shown so as to accommodate this lead. Note that the positioning of the leads of the TOSA 118 and ROSA 120 as they extend from the respective TOSA or ROSA bodies are typically fixed in accordance with industry standards. In this configuration, ready interconnection between the lead seats 122B/124B and the corresponding traces 134E/134F is achieved.

Figure 7:
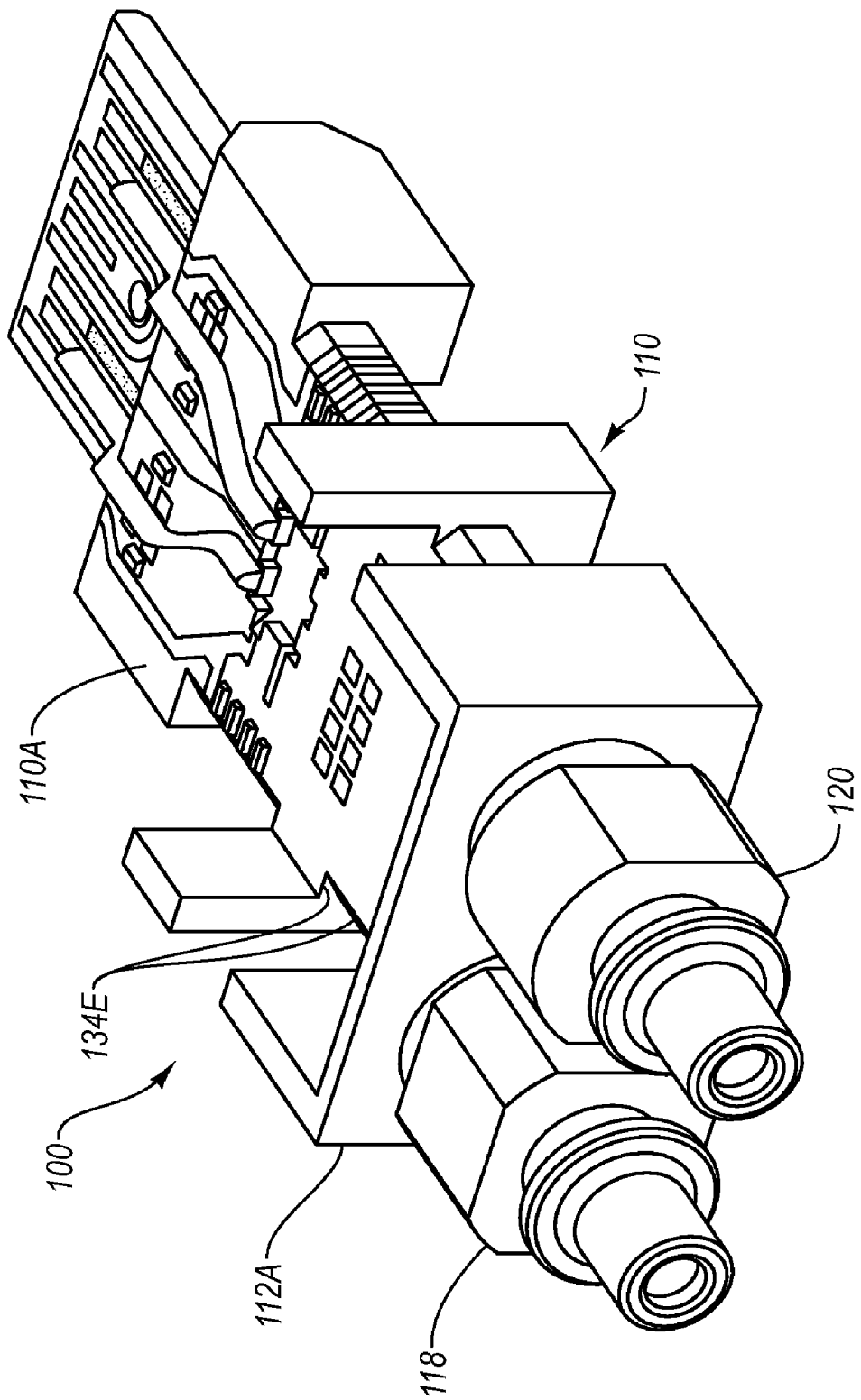
FIG. 7 is a top perspective view of the molded communications module of FIG. 6 in its assembled state.

FIGS. 2, 6, and 7 show the transceiver body 110 operably connected with the TOSA 118 and ROSA 120 such that electrical signals can pass there between. In particular, the TOSA leads 126 are received into the wall holes 122A of the TIP 122 such that the leads are received into the corresponding lead seats 122B. Similarly, the ROSA leads 128 are received into the wall holes 124A of the RIP 124 such that the leads are received into the corresponding lead seats 124B. Once received into the corresponding wall hole 122A/124A and lead seat 122B/124B, each lead of the TOSA 118 and ROSA 120 is secured by soldering or other suitable adhesive such that electrical signals can pass to and from the leads and lead seats.

Figure 4:
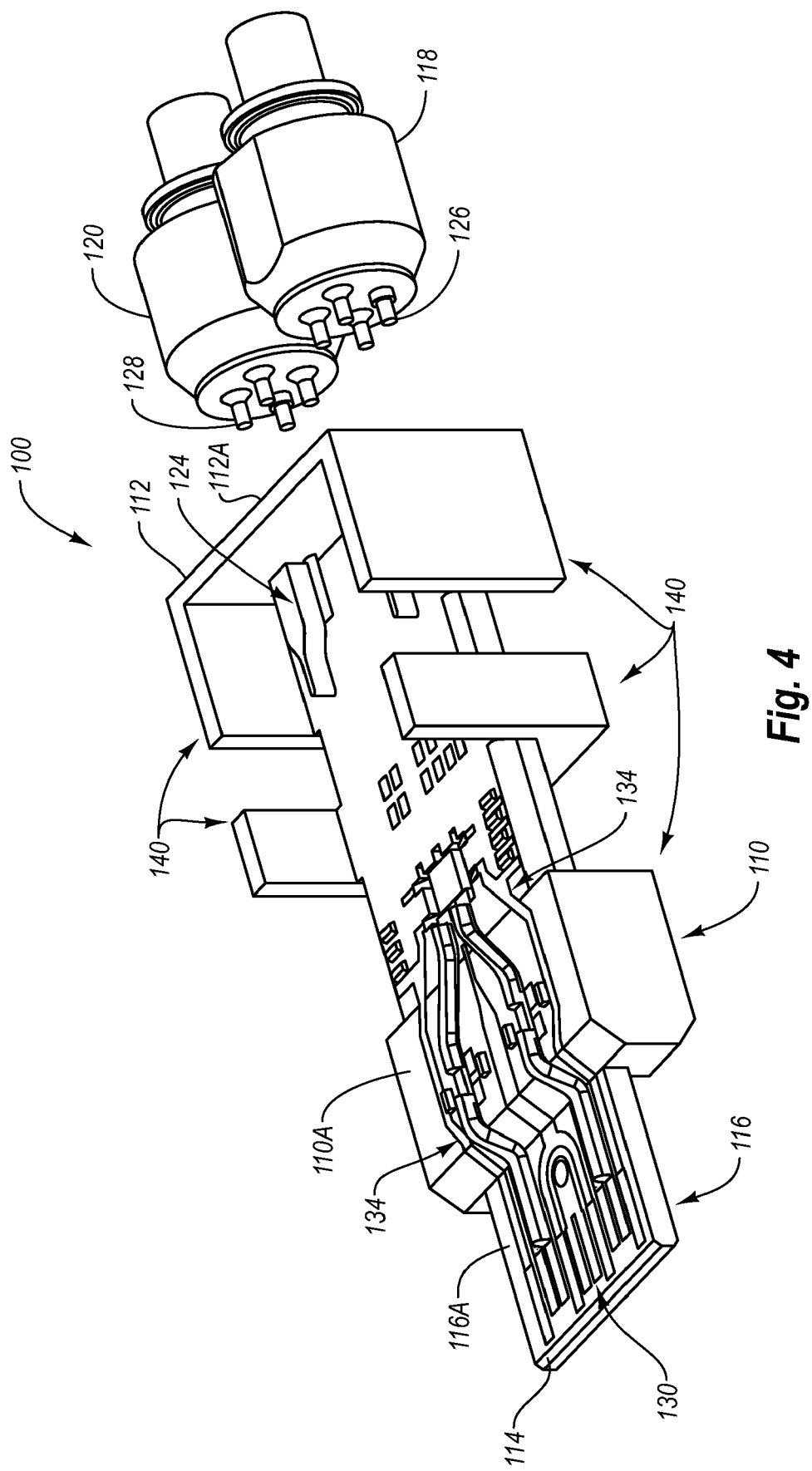
FIG. 4 is an exploded, perspective top view of the molded communications module of FIG. 2 including the two optical subassemblies, according to one embodiment of the present invention.

One advantage realized by the lead interconnection scheme described above is the obviation of the need to bend or otherwise orient the leads of the TOSA 118 or ROSA 120. This is so by virtue of the ability of the TOSA and ROSA interconnection portions 122 and 124 to provide structure for directly receiving the TOSA/ROSA leads 126 and 128 in their original orientations, as shown in FIG. 4. As has already been mentioned, prior known devices have been largely unable to electrically connect with an optical subassembly without either bending the leads or through the use of an intervening structure, such as a flexible circuit or lead frame connector. Lead bending is undesired for its propensity to cause hidden damage to glass seals disposed around the base of each TOSA/ROSA lead when bent to connect with a standard printed circuit board. And, as previously mentioned, the use of intervening structures presents issues with both device complexity and signal path impedance matching. The present invention overcomes the limitations of each of these scenarios by eliminating the need both for intervening structures and bending of the TOSA/ROSA leads, as already described.

Note that the illustrated interconnection scheme is but one possible configuration for operably connecting an optical subassembly to a molded communications module having plastic circuits. Indeed, it is appreciated that the particular shape and positioning of the elements of the TIP 122, the RIP 124, and the TOSA 118/ROSA 120 can be altered while still benefiting from the functionality of the present invention. For instance, the shape of the TOSA/ROSA leads could be other than cylindrical or could be arranged to extend from the respective OSA base differently from that shown in the accompanying figures. In such cases, the wall holes and lead seats of the TOSA and ROSA interconnect portions could be altered in shape and position to enable operable communication between the OSA and the transceiver or other communications module to be achieved. OSAs having more or fewer leads could also be included, and the number of OSAs connected to the transceiver can vary from what is shown.

It is also possible to enable the OSA leads to operably connect with the respective wall holes without the use of lead seats. In such a configuration, traces would be defined to operably connect with the wall holes, which holes would be conductively plated. In particular, the OSA leads would be soldered or adhesively attached directly to the wall hole surfaces. This serves as one example of expansion of the principles of the present invention beyond that explicitly illustrated and described herein.

3. Structural and Operational Aspects of Trace Interconnection Features

Figure 8:
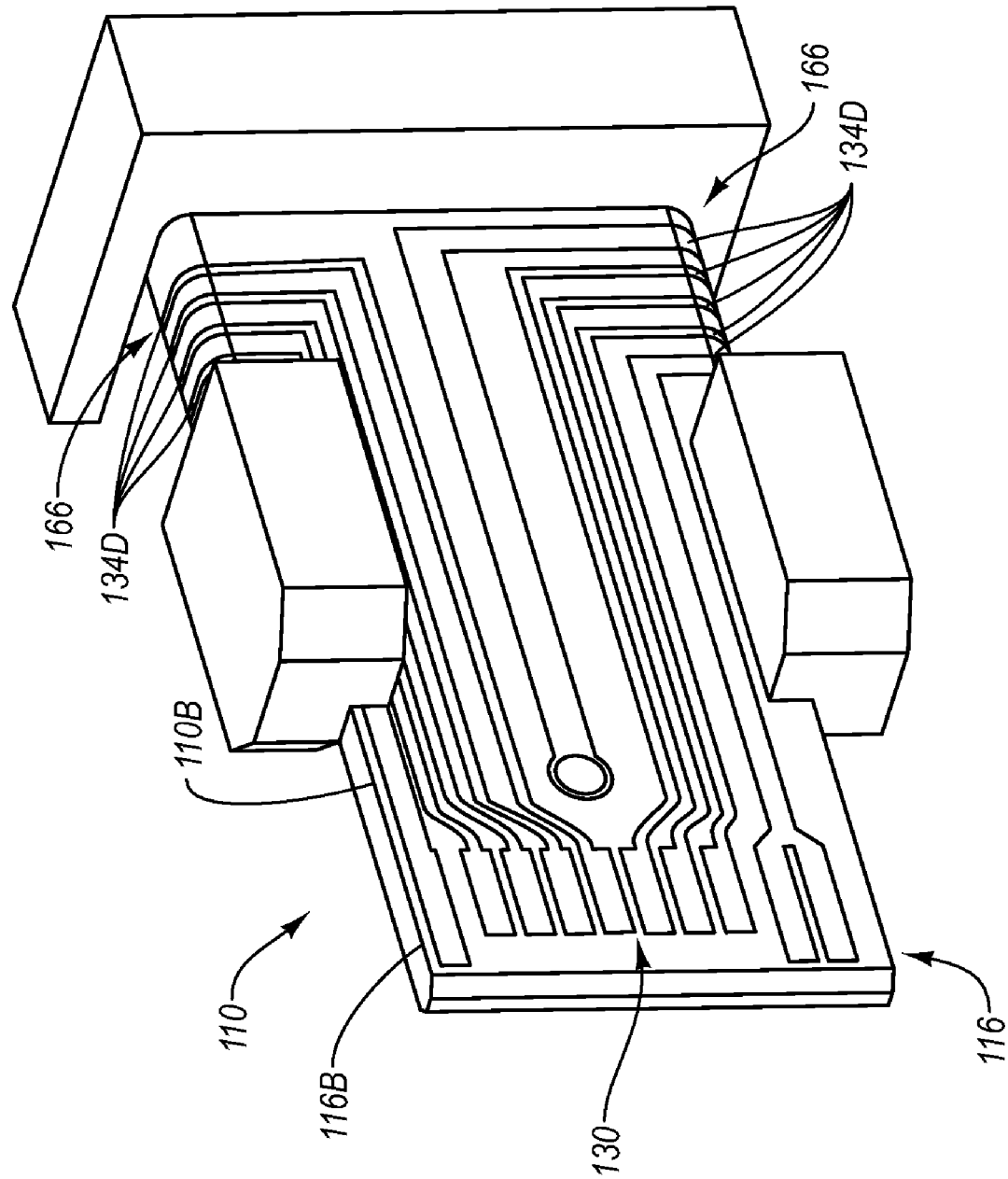
FIG. 8 is a perspective bottom view of the molded communications module according to one embodiment of the present invention.
Figure 10:
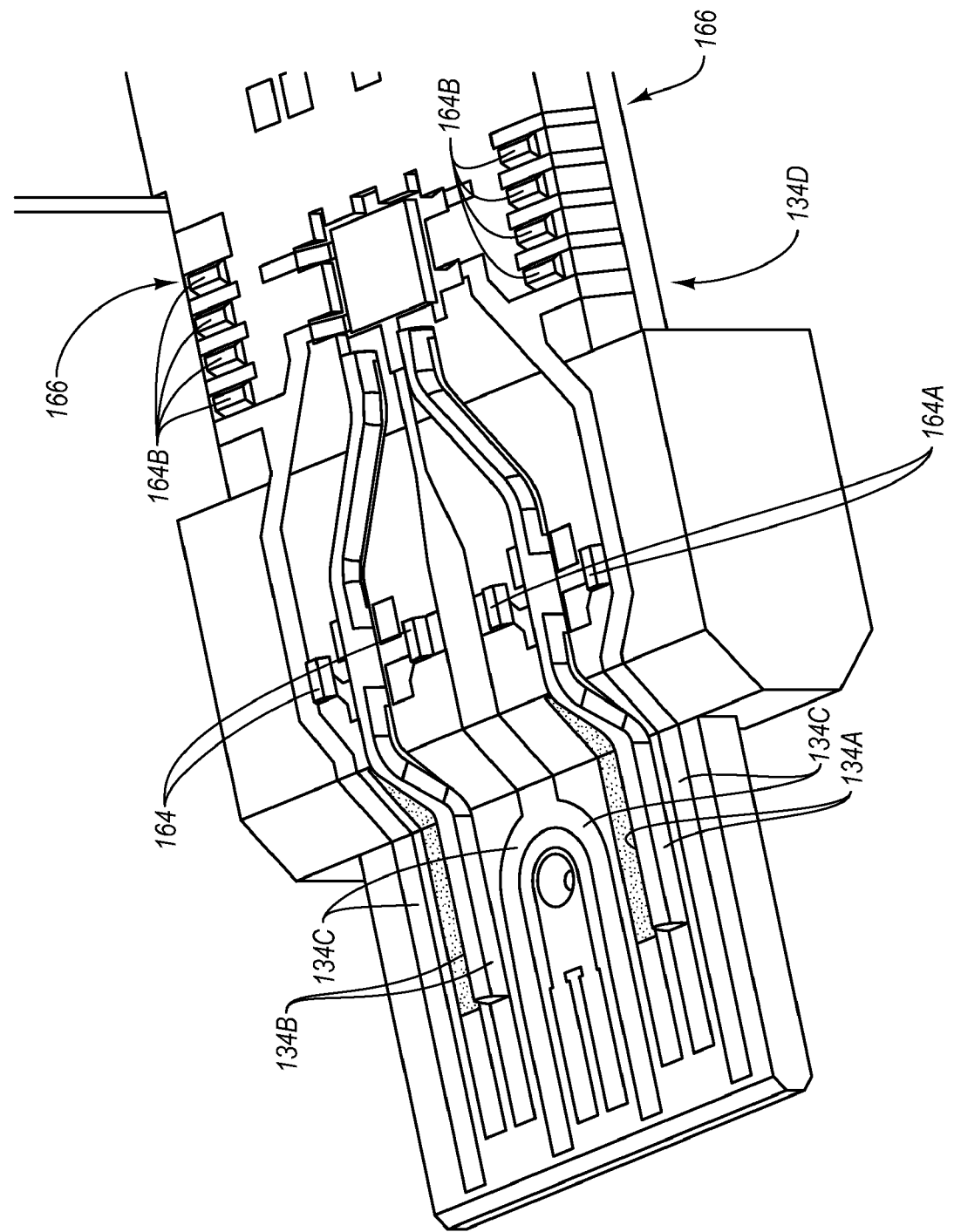
FIG. 10 is a close-up perspective view of the molded communications module of FIG. 3, including the trace interconnection features in a second state according to one embodiment of the present invention.

With continuing reference to FIG. 3, reference is now made to FIGS. 8 and 10. As briefly described above, various trace interconnection features ("TIF"s) 164 are included as extended portions defined on the transceiver body 110 to enable the temporary interconnection of selected conductive features of the transceiver body. Briefly, the electroless plating process spoken of above deposits a thin layer of conductive material, such as copper or gold, on all surfaces of the transceiver body 110 that have been previously laser etched. However, the thickness of the conductive layer deposited by this process is insufficient to meet the mechanical requirements for certain conductive surfaces of the transceiver body 110. For instance, the contact pads 130 of the edge connector 116 must include a conductive layer thicker than what can be normally provided via the electroless plating solution. This is necessary partially because of the physical engagement these surfaces undergo when the transceiver 100 is slid into/out of a host device, for example.

In light of the above limitation with the electroless plating solution, it is necessary to augment the conductive layer thickness of the contact pads 130 to ensure that these surfaces are sufficiently robust for mechanical engagement with the conductive features of the host device. Electroplating is one preferred way by which the contact pad conductive layer thicknesses can be increased. However, in order for electroplating to occur, the surfaces to be plated must be electrically connected one to another.

The present invention provides a means by which the conductive surfaces to be electroplated can be temporarily and electrically interconnected. Indeed, in one embodiment the TIFs 164 are used to interconnect selected traces 134 of the transceiver body 110, which traces in turn electrically interconnect the contact pads 130 to be electroplated.

As best seen in FIG. 3, a first set of four TIFs 164A are included on the transceiver top body surface 110A proximate the ridges 160A and 160B, while a second set of eight TIFs 164B are included near the outer edges of the transceiver body top surface proximate the trace passaround locations 166. The TIFs 164A and 164B are shaped in the illustrated embodiment as triangular surface features extending from the top body surface 110A and are conductively coated with a conductive material produced as a result of the laser etching and electroless plating process described further above. In addition, the TIFs 164 are each positioned so as to interconnect adjacent traces to one another. When such TIFs 164A and B are placed in series adjacent one another, a complete interconnection of all the desired trace 134 occurs. As shown, the TIFs 164 A electrically interconnect the traces or portions of the traces 134A, B, and C, while the TIFs 164B electrically connect the traces 134D that extend to the top body surface 110A from the bottom body surface 110B via the trace passaround locations 166. The two TIFs 164B nearest the back end 114 of the transceiver body 110 each interconnect with one of the traces 134D of the top body surface 110A, thereby completing interconnection of the traces 134A, B, and C with the traces 134D. So configured a complete trace interconnection for the desired trace portions is achieved.

With the desired portions of the traces 134 physically and therefore electrically interconnected as described above, an electroplating process can then be performed as standard in the art to deposit additional conductive material on desired portions of the transceiver body 110 such as, in the present case, the contact pads 130. Note that additional or alternative conductive features can also be electroplated, thereby illustrating one expansion of the principles of the present embodiment.

Once the electroplating process is complete, the temporary electrical interconnection of the various traces 134 must be terminated so as to allow for proper discrete operation of each trace once transceiver manufacture is complete. This is achieved by altering each of the TIFs 164 so as to interrupt the electrical interconnection it produces. In one embodiment, this interruption occurs by removing a portion of each TIF 164 by a grinding, milling, cutting, other suitable process. The result of such removal is best seen in FIG. 5, wherein a top portion of each triangular TIF 164 has been removed, thereby removing the conductive material on the TIF surface that formerly electrically interconnected the adjacent traces.

It is not necessary to remove the entire TIF structure, but rather only enough of the TIF structure that is necessary to eliminate any electrical connection between adjacent traces 164. When removing portions of the TIFs, especially those that will have a portion that remains connected to the high speed data signal traces 134A and 134B after removal, care should be taken to remove as much of the TIF as is needed to prevent the unwanted creation of a radiation point by the remaining portion of the TIF.

Note that FIG. 8 shows various details regarding the traces 134D included on the bottom body surface 110B. FIG. 8 further shows the manner in which the traces 134D pass from the bottom body surface 110B to the top body surface 110A via the trace passaround locations 166 to interconnect with the TIFs 164B. Use of the trace passaround locations 166 as configured in FIGS. 3, 8 and 10 enables a convenient transfer of traces from one transceiver body surface to another.

Note that, though they are disposed in the present embodiment in three general locations on the top body surface 110A, the TIFs 164A and B can alternatively be placed and grouped in any number of possible configurations on the transceiver body 110. For instance, the TIFs could be located in one, two, or more general locations on the transceiver body, both on bottom and top, depending on particular design and structural constraints of the transceiver.

Figure 9C:
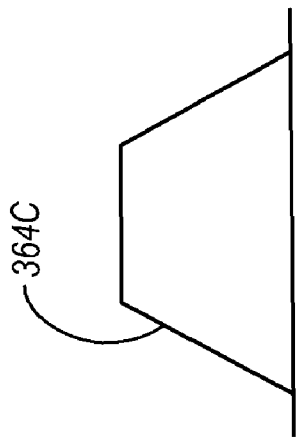
FIGS. 9A-9C are cross sectional end views of possible shapes of trace interconnection features configured in accordance with embodiments of the present invention.
Figure 9B:
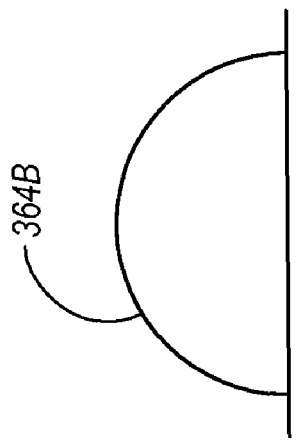
Figure 9A:
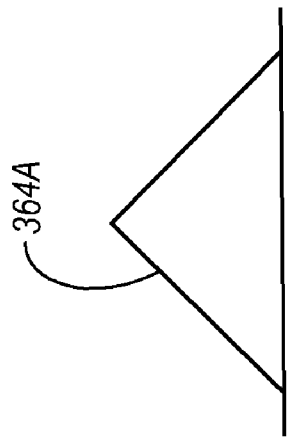

FIGS. 9A-9C show cross sectional views of various possible TIF shapes. FIG. 9A shows a TIF 364A having a triangular cross section, similar to the TIFs 164 shown in FIGS. 3, 8 and 10. FIG. 9B shows a TIF 364B having a semi-circular cross section, while TIF 364C in FIG. 9C has a trapezoidal, mesa-like structure. In addition to these possible shapes, other geometric and non-uniform shapes and configurations are also possible while still preserving the functionality of the TIF.

Figure 11A:
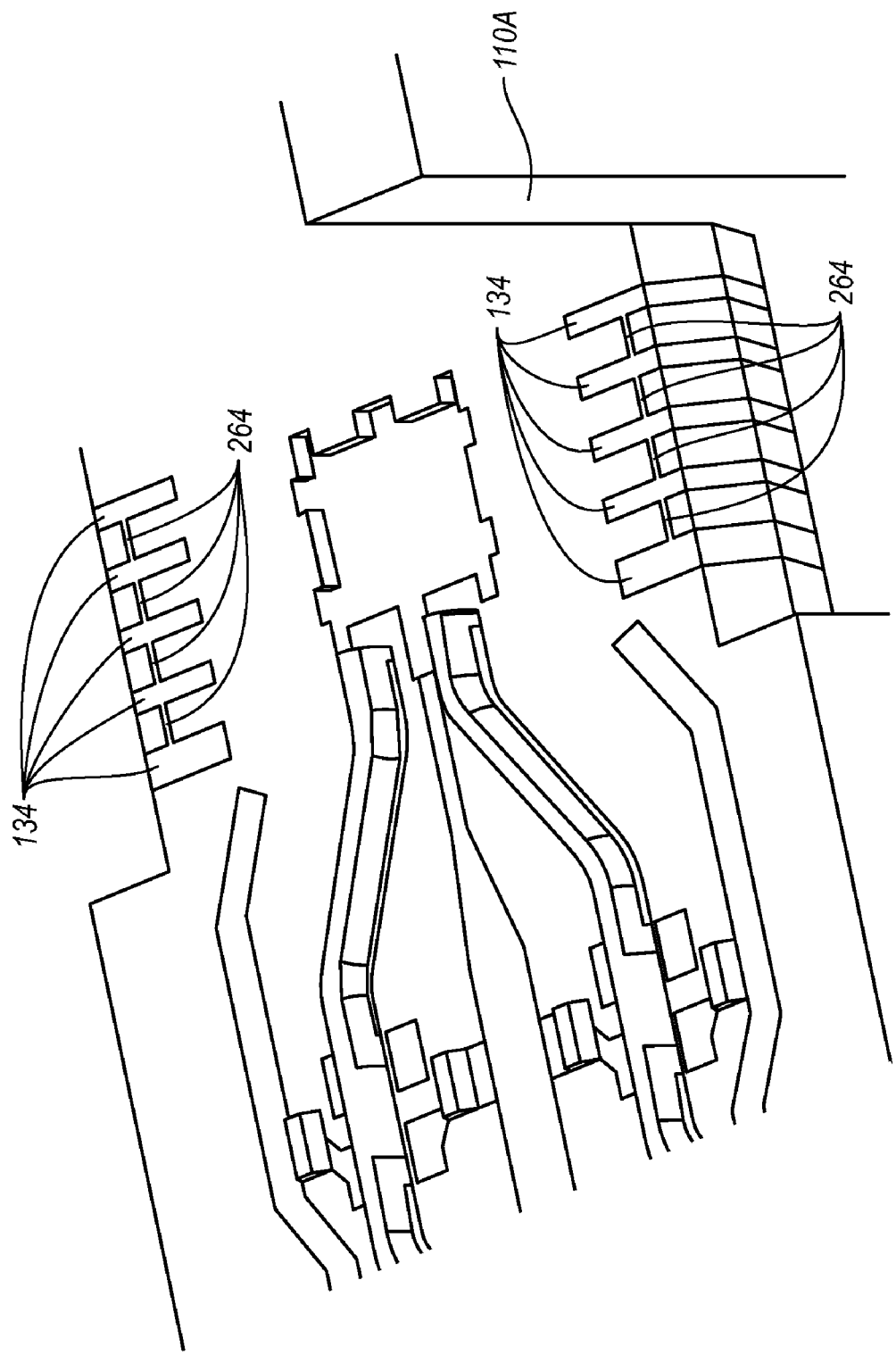
FIG. 11A is a perspective view of trace interconnection features in a first state according to another embodiment of the present invention.
Figure 11B:
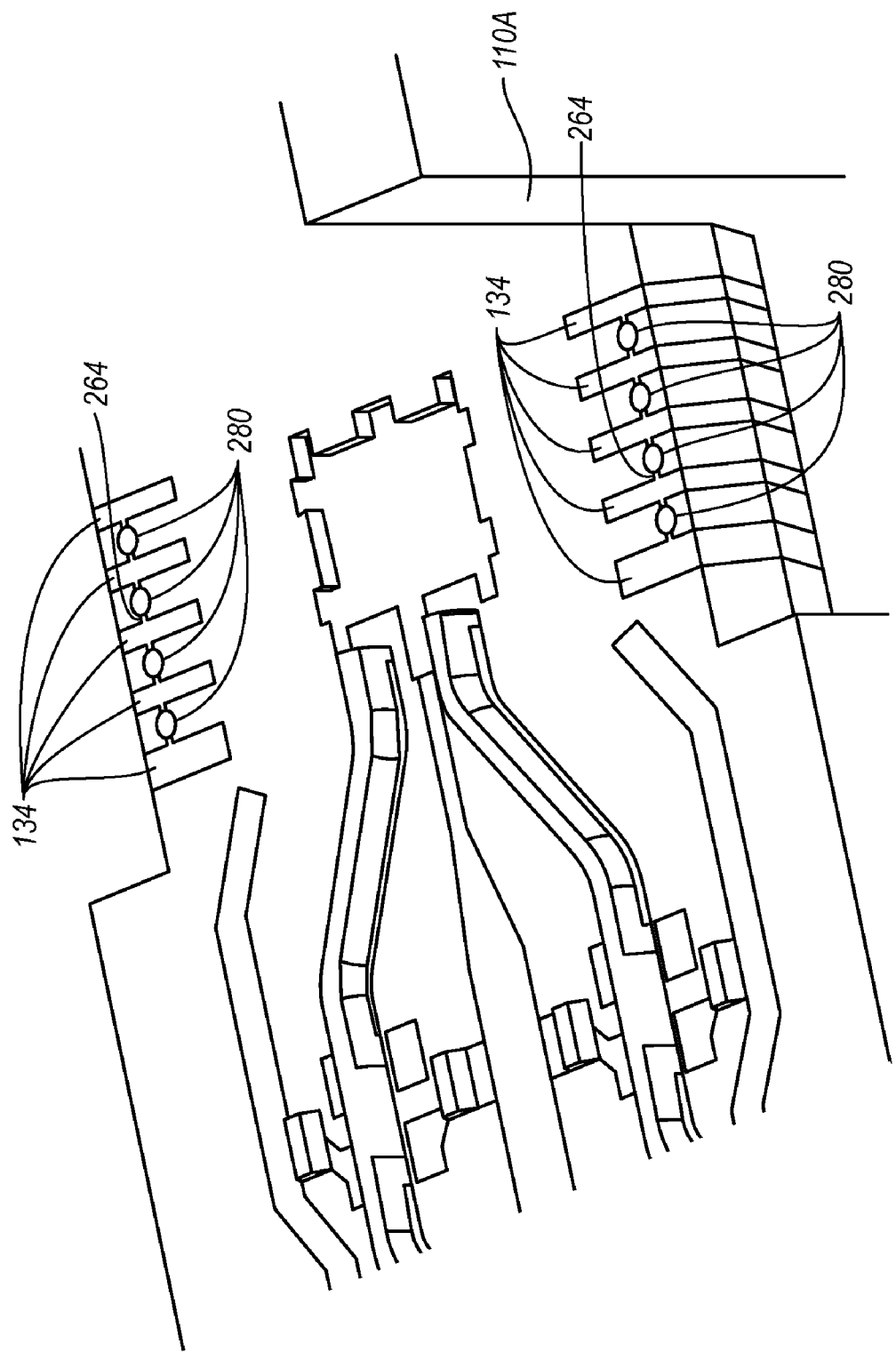
FIG. 11B is a perspective view of trace interconnection features in a second state according to one embodiment.

Reference is now made to FIGS. 11A and 11B, which depict details regarding TIFs configured in accordance with another embodiment. In particular, portions of various traces 134 disposed on the top body surface 110A of the transceiver body 110 are shown in a region proximate the trace passaround location 166. Between the various traces 134 is a plurality of TIFs 264, implemented as conductive features defined on the top body surface 110A by the laser etching and electroless plating described earlier. Indeed, in one embodiment the TIFs 264 are produced integrally with the traces 134 on the top body surface 110. In the configuration shown in FIG. 11A, electrical interconnection between the various traces 134 is established via the TIFs 264.

Figure 11C:
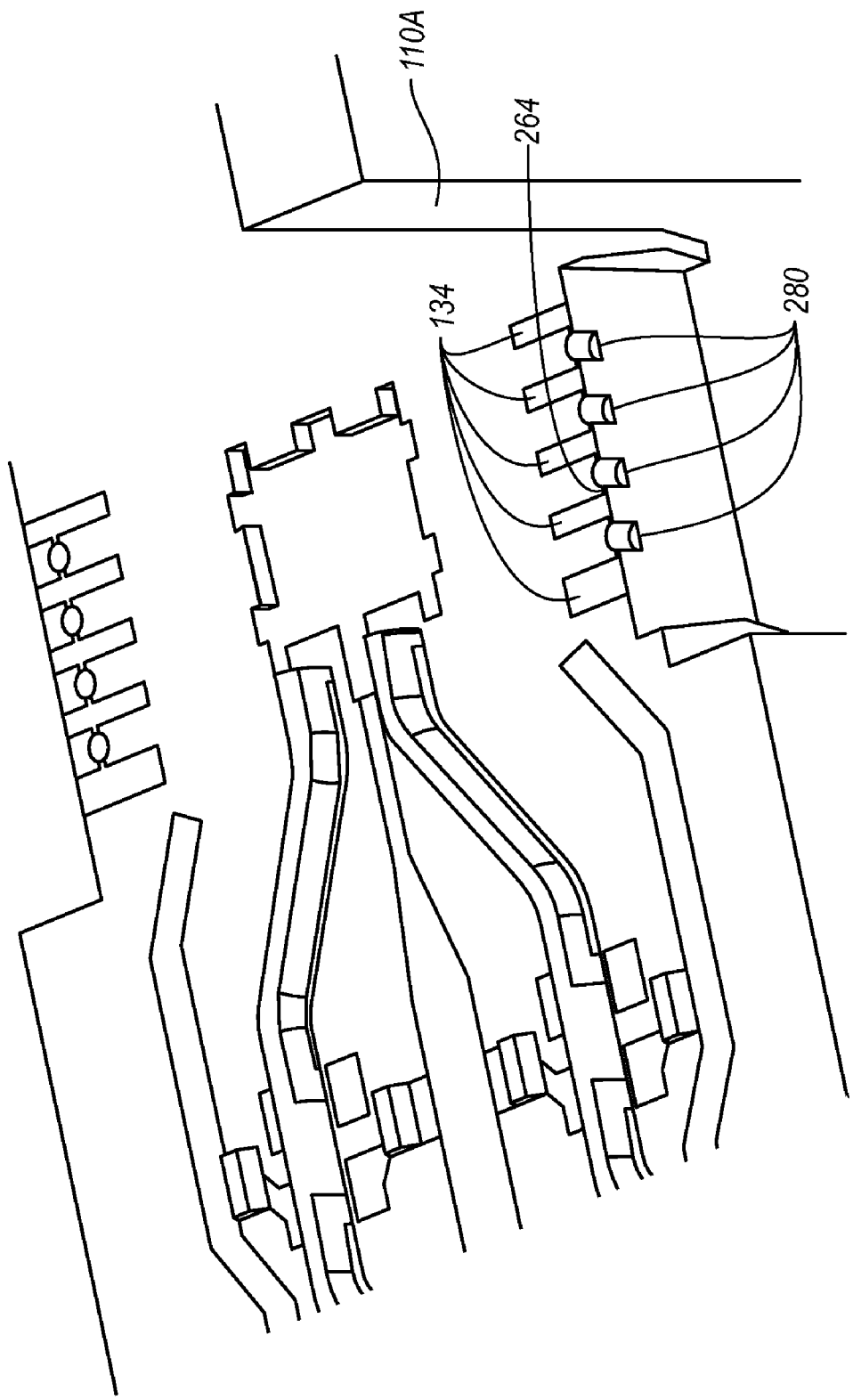
FIG. 11C is a perspective cutaway view of the trace interconnection features of FIG. 11B.

FIG. 11B shows the traces 134 in an electrically disconnected state, wherein the TIFs 264 are no longer interconnecting the traces. In particular, holes 280 are drilled or otherwise defined into the top body surface 110A to split each TIF 264 and disconnect the traces from one another. A punch, drill, drill press, or other suitable implement can be used to define the holes 280. The holes 280 need only be defined deep enough into the top body surface 110A to break the electrical continuity between adjacent traces 134. However, any suitable hole depth can also be defined, if desired. Also, the shape of the holes can be other than round, if needed. FIG. 11C shows a cutaway view of the holes 280, illustrating the nature of the electrical disconnection of the traces 134 made possible by the holes.

Though illustrated in FIGS. 11A and 11B as located proximate the trace passaround locations 166, the trace hole configuration shown can alternatively be placed in other locations, such as on the edge connector 116. These and other possible locations are therefore considered part of the present disclosure. Thus, placement of the TIFs can be chosen so as to minimize interference with other transceiver components.

Figure 12A:
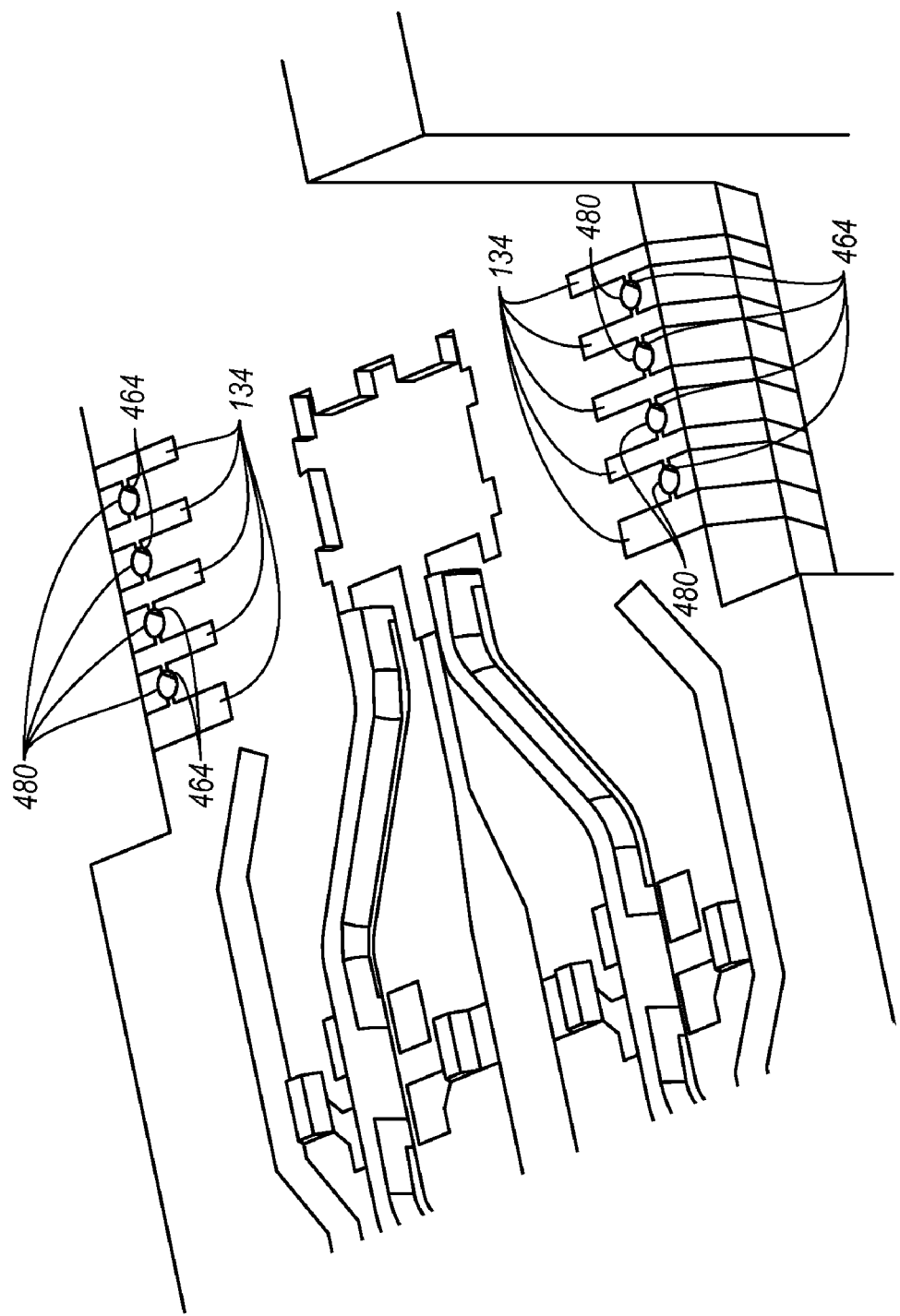
FIGS. 12A-12C are close-up perspective views of a molded communications module, including trace interconnection features configured together with "punch-out" features in accordance with yet another embodiment of the present invention.
Figure 12B:
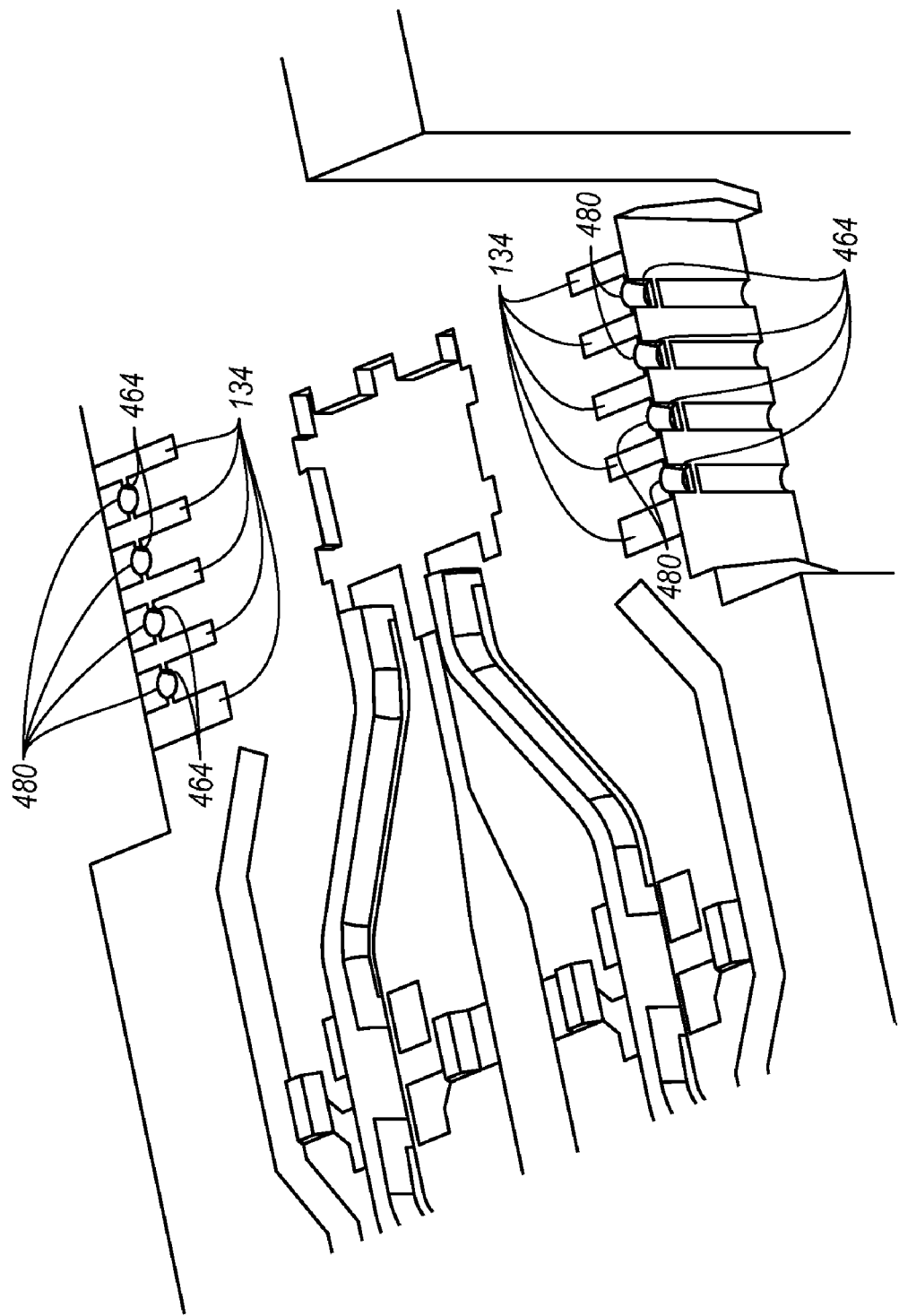
Figure 12C:
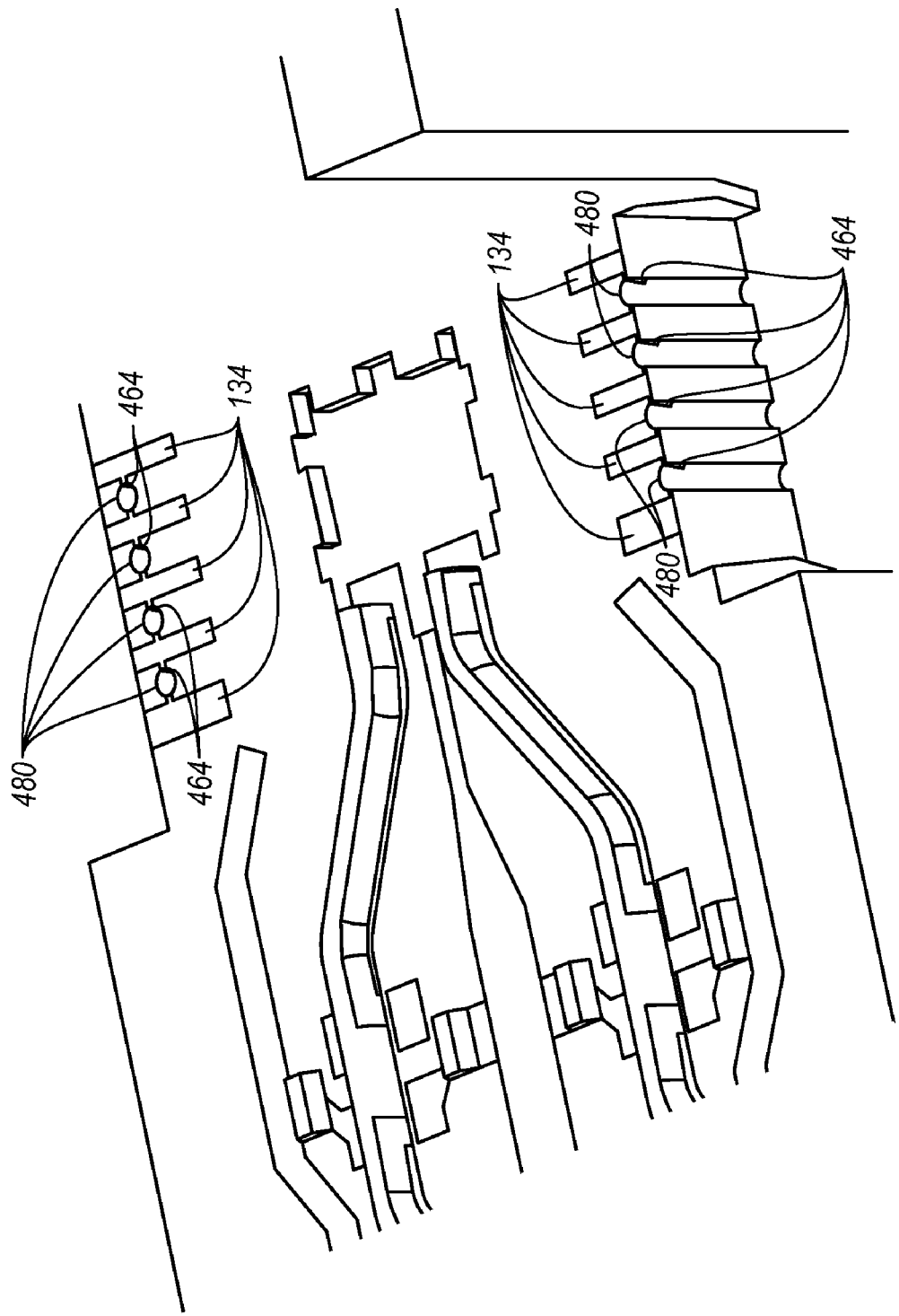

Reference is now made to FIGS. 12A-12C, which depict trace interconnection features employed in a configuration according to yet another embodiment of the present invention. As seen in these figures, a plurality of "punch-out" cavities 480 are interposed between both sets of traces 134 shown. Trace interconnection features ("TIFs") 464 are also defined between the traces 134 are aligned with the punch-out cavities 480 so as to extend down into and past each punch-out cavity. This arrangement is best seen in FIG. 12B where a floor of each punch-out cavity is positioned between either open end of the cavity. This configuration enables the TIFs 464 to electrically connect the traces 134 to one another in preparation for electroplating, as described above. Note that trace interconnection features can be defined on the top, bottom, or both surfaces of the floor of each punch-out cavity.

After electroplating is complete and interconnection of the traces is no longer needed, the floor of each punch-out cavity 480 is punched out by a suitable punching device. This electrically disconnects the traces 134 from one another, as desired. The design illustrated in these figures has the advantage of maintaining a planar surface in the region of the TIFs without the need for structures rising above the top or bottom surfaces of the transceiver body.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A communications module comprising:
   a body composed of a plastic resin;
   a plurality of conductive traces and contact pads defined on a portion of a surface of the body;
   at least one substantially vertical ridge defined on the body surface, wherein a pair of the traces are disposed on opposing surfaces of the at least one substantially vertical ridge such that effective impedance is defined between the pair of traces; and at least one pocket defined on the body suitable for receiving an electronic component.

2. The communications module in accordance with claim 1, wherein the body is injection molded and wherein the plastic resin contains a palladium catalyst.

3. The communications module in accordance with claim 1, wherein the at least one pocket is sized to enable a top surface of the electronic component to be proximate the body surface.

4. The communications module in accordance with claim 1, wherein a Transmit Optical Subassembly and/or a Receiver Optical Subassembly are in operable communication with the communications module.

5. The communications module in accordance with claim 1, wherein the at least one substantially vertical ridge is plated with conductive material that at least partially reduces the emission of EMI from the communications module.

6. The communications module in accordance with claim 1, wherein a back portion of the plastic resin body defines an edge connector configured to operably connect the communications module with a host computing device.

7. A communications module comprising:
a body composed of a plastic resin, the body including a top body surface and a bottom body surface; and
one or more conductive features defined on a surface of the body, wherein the one or more conductive features are configured to render the communications module operable without implementing a printed circuit board as part of the body, wherein the one or more conductive features comprise:
a plurality of signal traces defined on a portion of the top body surface and a portion of the bottom body surface; and
a via defined through the body so as to extend from the top surface to the bottom surface, wherein the via is configured to allow signals transmitted on the plurality of signal traces to be transferred from one body surface to the other body surface.

8. The communications module in accordance with claim 7, wherein the one or more conductive features comprise:
a plurality of body extensions that extend from a portion of the surface of the body configured to provide structural bracing or spacing and also configured to be plated with conductive material to at least partially reduces the emission of EMI from the communications module.

9. The communications module in accordance with claim 7, wherein the one or more conductive features comprise:
a component pocket configured to receive an electrical component, wherein the component pocket is sunken with respect to surface of the body such that the electrical component is positioned substantially level with surface of the body when placed in component pocket and wherein the component pocket includes one or more conductive pads for electrically coupling the electrical component with one or more signal traces defined on the surface.

10. The communications module in accordance with claim 7, wherein the one or more conductive features comprise:
one or more substantially vertical ridges configured to have conductive traces defined on opposing sides of the ridges such that effective impedance is defined between the traces.

11. The communications module in accordance with claim 10, wherein an edge connector for coupling the communications module with a host computing device is defined at a back portion of the body surface, wherein the one or more conductive features comprise:
a plurality of troughs defined on a top surface of the edge connector, wherein the plurality of troughs are configures to allow the one or more substantially vertical ridges to extend into the edge connector is such as way as to not exceed a predetermined height.

12. The communications module in accordance with claim 7, wherein the one or more conductive features comprise:
a plurality of trace interconnections configured to temporarily interconnect two or more traces implemented on the body surface.

13. A system for electrically connecting at least one optical subassembly to an optical transceiver module, the optical transceiver module having a molded body and conductive features defined on portions of the molded body, the system comprising:
an interconnect portion integrally formed with the molded body including:
a plurality of holes defined on a front wall of the molded body, the holes being configured to each receive a corresponding one of a plurality of leads extending from an optical subassembly; and
a plurality of lead seats each in communication with a corresponding one of the plurality of holes, each lead seat configured such that the lead received by the corresponding hole is in electrical communication with the lead seat; and
a plurality of traces defined on the molded body that each electrically connect with a corresponding one of the lead seats.

14. The system in accordance claim 13, wherein the optical subassembly is a first optical subassembly, the interconnect portion is a first interconnect portion, the plurality of holes are a first plurality of holes and the plurality of lead seats is a first plurality of lead seats, the system further comprising a second interconnect portion integrally formed with the molded body including:
a second plurality of holes defined on the front wall of the molded body, the holes being configured to each receive a corresponding of a plurality of leads extending from a second optical subassembly; and
a second plurality of lead seats each in communication with a corresponding one of the second plurality of holes, each lead seat configured such that the lead received by the corresponding hole is in electrical communication with the lead seat; and
wherein the plurality of traces defined on the molded body electrically connect with a corresponding one of the second plurality of lead seats.

15. The system in accordance claim 14, wherein the first optical subassembly comprises a transmit optical subassembly (TOSA) and the second optical subassembly comprises a receive optical subassembly (ROSA) or wherein the first optical subassembly comprises a ROSA and the second optical subassembly comprises a TOSA.

* * * * *